United States Patent
Lopriano

(10) Patent No.: US 11,548,187 B2
(45) Date of Patent: Jan. 10, 2023

(54) AUTOMATIC TILE CUTTER

(71) Applicant: Pietro Lopriano, Manage (BE)

(72) Inventor: Pietro Lopriano, Manage (BE)

( * ) Notice: Subject to any disclaimer, the term of this patent is extended or adjusted under 35 U.S.C. 154(b) by 884 days.

(21) Appl. No.: 16/314,193

(22) PCT Filed: Jun. 20, 2017

(86) PCT No.: PCT/BE2017/000030
§ 371 (c)(1),
(2) Date: Dec. 28, 2018

(87) PCT Pub. No.: WO2018/000053
PCT Pub. Date: Jan. 4, 2018

(65) Prior Publication Data
US 2019/0202085 A1 Jul. 4, 2019

(30) Foreign Application Priority Data
Jun. 30, 2016 (BE) .................................... 2016/0113

(51) Int. Cl.
*B28D 7/04* (2006.01)
*B23D 47/04* (2006.01)
(Continued)

(52) U.S. Cl.
CPC .............. *B28D 7/04* (2013.01); *B23D 47/042* (2013.01); *B28D 1/044* (2013.01); *B28D 1/24* (2013.01); *B28D 7/005* (2013.01)

(58) Field of Classification Search
CPC . B28D 1/24; B28D 1/04; B28D 1/044; B28D 1/047; B28D 1/10; B28D 7/04; B28D 7/005; B23D 7/042; B23D 47/042
(Continued)

(56) References Cited

U.S. PATENT DOCUMENTS 4,468,992 A * 9/1984 McGeehee .............. B27B 5/187
144/378
5,088,364 A * 2/1992 Stolzer ................. B23D 47/042
83/153
(Continued)

FOREIGN PATENT DOCUMENTS

CN 103753713 4/2014
CN 204701006 10/2015
(Continued)

OTHER PUBLICATIONS

International Searching Authority, "International Search Report and Written Opinion," issued in connection with PCT Patent application No. PCT/BE2017/000030, dated Sep. 22, 2017, 12 pages.

*Primary Examiner* — Orlando E Aviles
*Assistant Examiner* — Marcel T Dion
(74) *Attorney, Agent, or Firm* — Hanley, Flight & Zimmerman, LLC

(57) ABSTRACT

The invention relates to an automatic tile cutter (1) comprising a cutting table (31) for receiving a tile (21) to be cut, and at least one cutting tool (59) that is translatably movable along a guide rail (61) and is to cut the tile along a cutting line such that a cut tile and scraps are obtained, characterized in that the tile cutter additionally comprises: —at least a first conveyor (11) for conveying the tile (21) from a tile loading zone (5) to a tile cutting zone (7); —at least two abutments (15) for blocking the movement of the tile (21) in a predefined tile position in the cutting zone; and —an electronic control unit (57) configured to control the positioning of the abutment elements (15) and the cutting tool (59) relative to each other in accordance with predefined cutting parameters and actuate the cutting tool.

14 Claims, 3 Drawing Sheets

Figure 1:
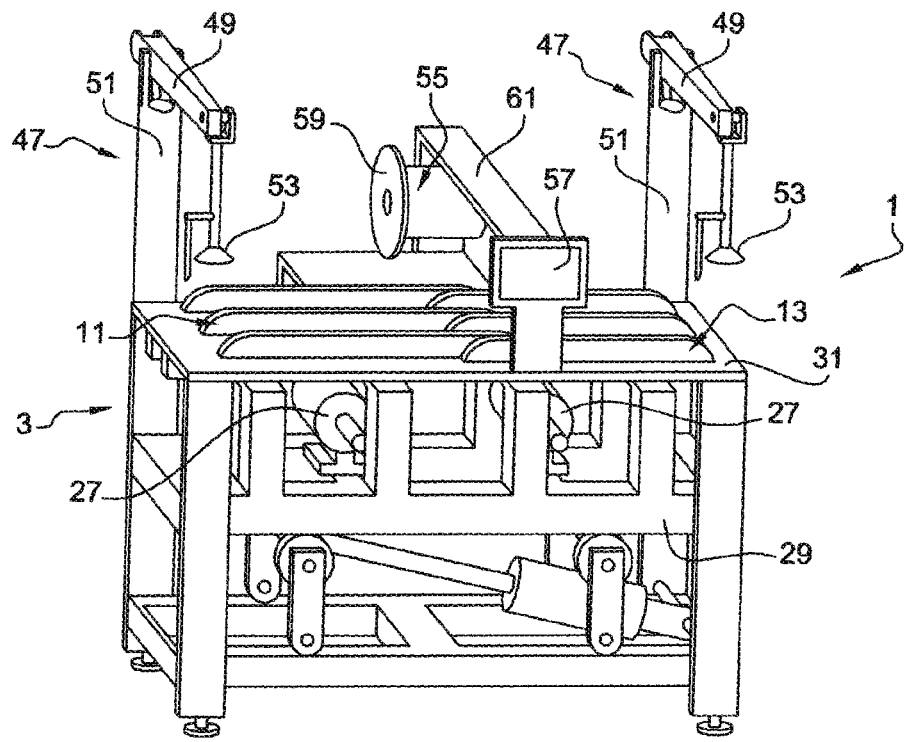

(51) Int. Cl.
*B28D 1/04* (2006.01)
*B28D 1/24* (2006.01)
*B28D 7/00* (2006.01)

(58) Field of Classification Search
USPC .......... 125/12, 13.01, 14; 451/260, 282, 336
See application file for complete search history.

(56) References Cited

U.S. PATENT DOCUMENTS

| | | | |
|---|---|---|---|
| 5,865,080 A * | 2/1999 | Jackson | B27B 31/006 83/74 |
| 5,966,798 A * | 10/1999 | Ohnishi | B23D 47/042 198/345.3 |
| 6,006,735 A | 12/1999 | Schlough et al. | |
| 6,080,041 A * | 6/2000 | Greenland | B24B 49/00 125/13.01 |
| 6,131,557 A * | 10/2000 | Watson | B23D 59/001 125/13.01 |
| 6,240,821 B1 | 6/2001 | Landers et al. | |
| 6,883,511 B1 * | 4/2005 | Tsao | B23D 47/02 125/13.01 |
| 9,808,962 B2 | 11/2017 | Moog et al. | |
| 2002/0046919 A1 * | 4/2002 | Gariglio | B24B 27/0076 198/345.1 |
| 2005/0288161 A1 | 12/2005 | Toncelli | |
| 2008/0295819 A1 * | 12/2008 | Gifford | B28D 1/043 125/13.01 |
| 2008/0295821 A1 * | 12/2008 | Gifford | B26D 7/20 125/14 |
| 2009/0126711 A1 * | 5/2009 | Gomez | B28D 1/005 125/15 |
| 2010/0330888 A1 * | 12/2010 | Bando | B24B 27/0023 451/282 |
| 2013/0205564 A1 | 8/2013 | Dick et al. | |
| 2015/0290838 A1 * | 10/2015 | Lovato | B28D 1/046 125/13.01 |
| 2019/0086896 A1 * | 3/2019 | Gariglio | G05B 19/402 |

FOREIGN PATENT DOCUMENTS

| | | |
|---|---|---|
| EP | 2168742 | 3/2010 |
| EP | 2978574 | 10/2017 |
| FR | 3028200 | 5/2016 |

* cited by examiner

AUTOMATIC TILE CUTTER

This patent arises from the U.S. national stage of International Patent Application Serial No. PCT/BE2017/000030, having an international filing date of Jun. 20, 2017, and claims benefit of Belgian Patent Application No. BE2016/0113, filed on Jun. 30, 2016. Priority is claimed to International Patent Application Serial No. PCT/BE2017/000030 and Belgian Patent Application No. BE2016/0113. International Patent Application Serial No. PCT/BE2017/000030 and Belgian Patent Application No. BE2016/0113 are both are hereby incorporated by reference in their entireties for all purposes.

The invention relates to a device allowing automatic cutting of tiles, the device being able to be used on a site or by a private individual when tiling of a floor, a ceiling or a wall. The invention also relates to a method for cutting such a tile.

Tiles for tiling surfaces may be produced in different ways and for example by cutting from large-sized sheets.

One example of a device for producing tiles is given by document EP2168742 which describes an industrial device for cutting tiles from a sheet that makes it possible to optimize the number of tiles cut from said sheet according to their size, their shape, and any defects that the starting sheet may exhibit.

Once produced, the tiles are packaged and marketed so that they can be laid for covering floors, walls or ceilings. The tiles may be laid whole or cut as required. When the tiles are cut, this cut may be straight or diagonal. The dimensions of the cut tile are defined according to where the tiler is to place said tile. The cutting of the tile is therefore done at the site itself, rather than at the factory. The tiler will therefore first of all define a cutting line on the tile and then use a tile cutter, generally a manual or electric one, to cut the tile along said cutting line and thus obtain a cut tile and an offcut. Tile cutters are designed to cut one tile at a time.

Examples of known manual tile cutters are given in documents EP2978574 and FR3028200. An example of an electric tile cutter is given by document CN204701006 which also proposes handling of the tile so that the latter can be cut automatically. Nevertheless, the positioning of the tile on the tile cutter in order to allow a defined cut still has to be performed by the user as does the loading of the tile and the offloading of the cut tile and of its offcut. A solution therefore still needs to be found for optimizing the tile cutting process further.

Specifically, whether the tile cutters are manual or electric, they still require the tiler to be present and to handle the tiles and the tile cutter. Now, the tiler will sometimes perform the same cut several times over or may determine in advance the dimensions of the tiles that he is going to need. The time devoted to cutting the tiles may be significant and may be used differently if it were to possible to automate the cutting. It would therefore be advantageous to be able to have an automatic tile cutter that could be programmed to cut one or more tiles along determined cutting lines without requiring user intervention, or at the very least which limits the need for user intervention.

It would be more beneficial to be able to have an automatic tile cutter that was compact and portable so that it could easily be transported from one site to another, from room to another, or even be used by a private individual.

It is an objective of the invention to overcome at least one of the disadvantages encountered in the prior art.

To this end, the invention relates to
tile cutter comprising:
- a cutting table intended to accept a tile that is to be cut, and
- at least one cutting tool, preferably a cutting blade, capable of translational movement along a guide rail and intended to perform the cutting of the tile along a cutting line so as to obtain a cut tile and an offcut;

notable in that the tile cutter comprises:
- at least one first conveyor intended to transport the tile from a loading zone where said tile is loaded as far as a tile cutting zone,
- at least two end stops intended to halt the movement of the tile in the cutting zone by placing it in a predefined position, and
- an electronic control unit configured to control the respective placement of the end stops and of the cutting tool according to predefined cutting parameters and to actuate the cutting tool.

According to particular embodiments, the invention may comprise one or another of the following features, considered alone or in any possible combination:
- the tile cutter is an automatic tile cutter.
- The end stops are mobile and associated with positioning means for positioning along the length of the cutting table.
- The means for positioning the end stops comprise actuating cylinders.
- The end stops are distributed across the width of the cutting table.
- The electronic control unit is configured to control the positioning means of each end stop independently so that the end stops can be placed in line with or offset from one another along the length of the cutting table.
- The guide rail of the cutting tool is mobile along the cutting table and/or angularly orientable with respect to the width of the cutting table so as to be able to cut the tile along a cutting line that is not perpendicular and not parallel to the length of the cutting table.
- The guide rail has a fixed position with respect to the cutting table, and is preferably arranged in such a way as to cut the tile along a cutting line perpendicular to the length of the cutting table.
- The means for positioning the guide rail are controlled by the electronic unit.
- The guide rail and/or the cutting tool (preferably the blade) are mobile vertically so as to have an elevated position during cutting operations and a lowered position during cutting operations.
- The tile cutter comprises means for raising and lowering the cutting table and/or the conveyor or conveyors, said means being configured to move the cutting table and/or the conveyor or conveyors vertically in order to place the conveyor or conveyors in an elevated position with respect to the cutting table so that the tile, or the cut tile and the offcut, are borne by the conveyor or conveyors or in a lowered position so that the tile, or the cut tile and the offcut, rest on the cutting table.
- The conveyor or conveyors each have at least two and preferably at least three conveying belts or wires distributed across the width of the cutting table.
- The end stops are mobile between an abutment position in which they oppose the movement of the tile by the conveyor or conveyors and a retracted position in which they do not oppose the movement of the tile by the conveyor or conveyors.
- The end stops are placed in a retracted position or in an abutment position by vertical movement or by rotation from their lower end.

In the abutment position, the end stops extend vertically above the conveyor or conveyors.

In the retracted position, the end stops are placed under the cutting table.

The tile cutter comprises at least three end stops and the electronic control unit is configured to place said end stops in the abutment position successively when at least two end stops are not aligned along the length of the cutting table; for preference, at least two end stops are placed in the abutment position in a first phase (so as to allow the tile to turn in order to position itself) and at least one end stop is placed in the abutment position in a second phase (in order to prevent a translational movement of the tile along the at least two first end stops).

The cutting table has a non-slip support. The tile is effectively immobile during the cutting phase. It is the cutting tool (i.e. the blade), rather than the tile, that moves during the cutting operation.

The tile cutter comprises at least one second conveyor extending from the cutting zone as far as the offloading zone for offloading the cut tile, the first and second conveyors being arranged one after the other along the length of the cutting table.

The electronic control unit is configured to control the removal of the offcut and of the cut tile by the first and second conveyors in opposite directions.

The tile cutter further comprises means for loading tiles from a storage zone as far as the loading zone, and/or means for offloading the cut tile and its offcut.

Said means for loading the tile and offloading the cut tile and its offcut comprise an articulated arm fitted with a tile grasping tool (i.e. with a venturi suction cup or with a lateral gripping means).

The offcut offloading zone coincides with the tile loading zone and the tile loading means coincide with the offcut offloading means.

The electronic control unit is configured to determine the size of the offcut according to the size of the tile that is to be cut and the position of the cutting line on said tile, and to sort the offcuts according to size using the means for offloading the offcut.

The invention also relates to a method for cutting a tile by means of a tile cutter as defined hereinabove, notable in that it comprises the following steps:

i) the inputting of data into the electronic control unit with a view to defining a cutting line on a tile for cutting;
ii) the positioning of the end stops and/or of the cutting tool (preferably the cutting blade) by means of its guide rail according to the cutting line defined in the preceding step;
iii) the loading of a tile onto the loading zone;
iv) the conveying of the tile by at least a first conveyor from the loading zone as far as the cutting zone and the positioning of the tile by contact with the end stops;
v) the setting-down of the tile on the cutting table by placing the conveyor or conveyors in the lower position and preferably bringing the end stops into the retracted position;
vi) the cutting of the tile along the defined cutting line;
vii) the offloading of the cut tile and of its offcut, preferably in opposite directions.

As will have been understood from reading the definition thereof that has just been given, that the invention consists, according to a first aspect, in proposing a tile cutter capable of automatically placing a tile in a determined position on the cutting table so as to be able to cut this tile along a predefined and programmed cutting line. Unlike conventional, manual or electric, tile cutters, it is no longer the user but rather an electronic control unit that will position the tile with a view to cutting same. The invention offers increased user safety by comparison with the tile cutters of the prior art because the user can station himself some distance away from the tile cutter throughout the cutting operation.

According to a second aspect, the tile cutter according to the invention has automatic means for loading the tiles and for offloading the cut tiles and the offcuts. It is therefore possible to program the cutting of a plurality of tiles and to leave the tiles to be cut without the need to intervene. Advantageously, the cut tiles and the offcuts are offloaded at different points so that they can be easily identified. Another advantage of the tile cutter according to the invention is that it can be programmed to sort the offcuts according to size so that certain offcuts may potentially be reused.

Figure 2:
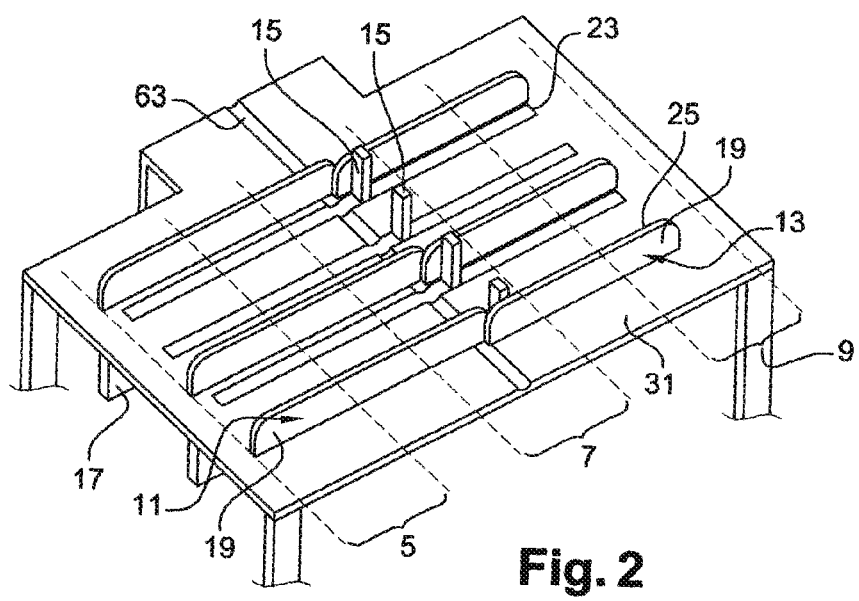
Figure 3:
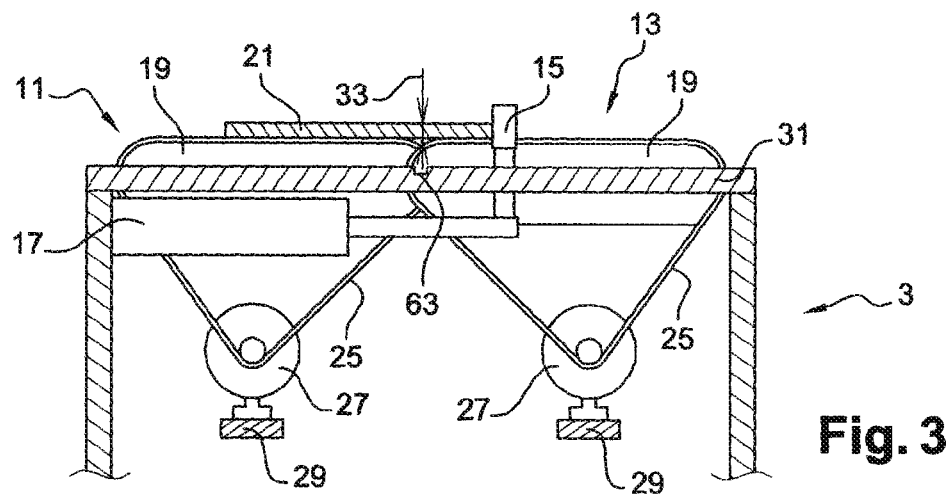
Figure 4A:
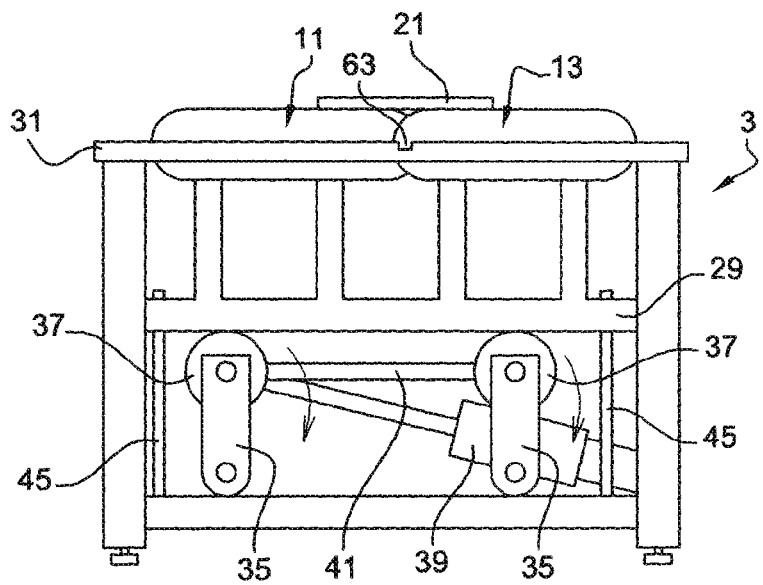
Figure 4B:
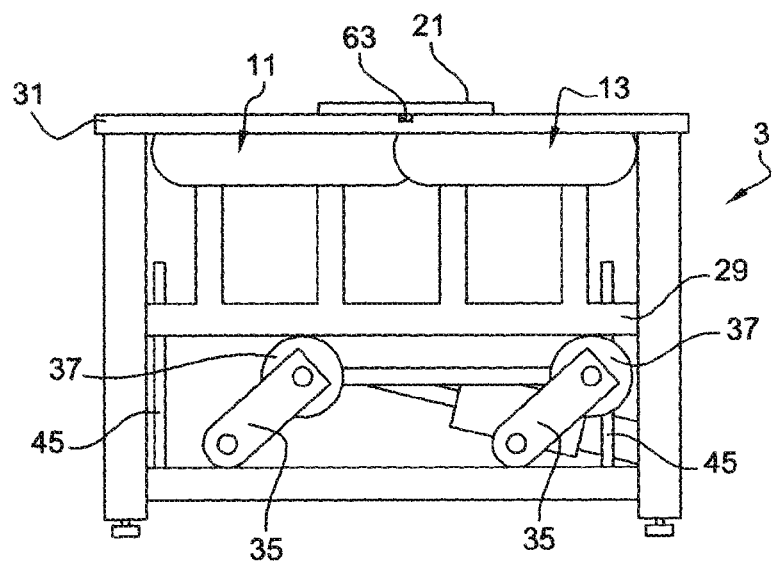
Figure 4C:
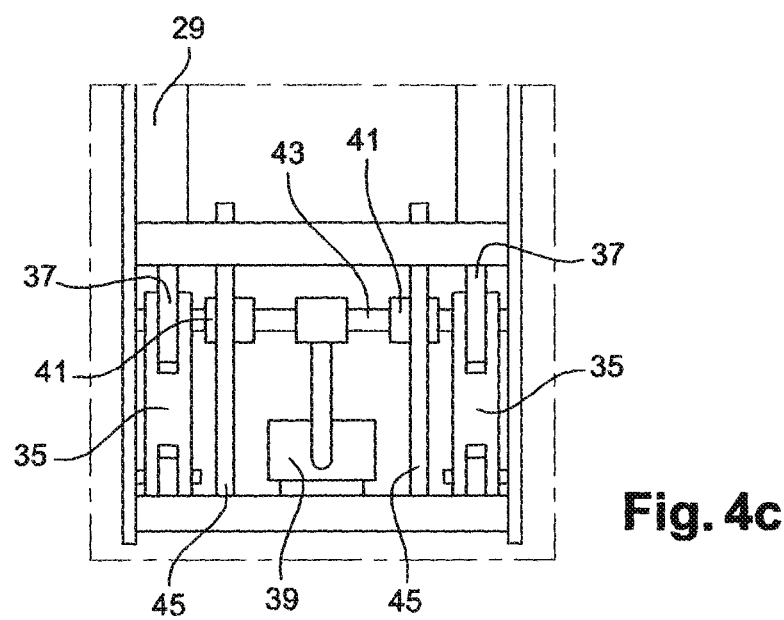

The invention will be clearly understood and further aspects and advantages will become clearly apparent from reading the following description given by way of example with reference to the attached plates of drawings in which:

FIG. 1 illustrates one embodiment of a tile cutter according to the invention FIG. 2 is a view from above of the cutting table of a tile cutter according to the invention FIG. 3 is a profile view in cross section of a tile cutter according to the invention FIGS. 4*a*, 4*b* and 4*c* illustrate one example of means for raising and lowering the conveyors.

In the description which follows, the term "comprise" is used synonymously with "include" and is nonlimiting insofar as it allows there to be other elements in the tile cutter or the mechanism to which it relates. It should be understood that the term "comprise" includes the term "consists of". The terms "lower", "upper", "in front of" and "behind" will be understood with respect to the overall orientation of the tile cutter. "Lower" will denote greater proximity to the ground than "upper" along a vertical axis. In the various figures, the same references refer to elements that are identical or similar.

Reference will be made first of all to FIG. 1 which shows a tile cutter 1 according to the invention. The invention also relates to a tile cutting method implemented by the tile cutter 1 according to the invention and which will be described in parallel with said tile cutter.

The invention is described here in connection with the cutting of tiles made of building materials such as tiles made of ceramic, faience, terracotta, earthenware, marble, cement, or even of composite materials such as vinyl or the like. Nevertheless, it can be applied without difficulty to the cutting of elements made of other materials, such as planks of wood, whether their surface is smooth or irregular, porous or nonporous.

The tile cutter 1 comprises a support 3 comprising a cutting table 31 intended to accept a tile that is to be cut. It also comprises at least one cutting tool 59, preferably a cutting blade 59, capable of translational movement along a guide rail 61. The invention will be described in connection with a cutting tool 59 comprising a cutting blade, for example a disk, but still applies to the use of other cutting tools such as, for example, laser cutting tools.

According to the invention, the tile cutter 1 further comprises at least one conveyor 11 intended to convey the tile from a tile loading zone as far as a tile cutting zone. The movement of the tile in the cutting zone is halted by at least two end stops (not depicted in FIG. 1) of which the positioning of the one relative to the other and relative to the cutting table 31 will allow the tile to be placed in a determined position with respect to the cutting tool 59, for example the cutting blade 59. The invention also comprises an electronic control unit 57 configured to control the respective placement of the end stops and of the cutting tool 59 (i.e. the cutting blade 59) according to predefined cutting parameters and to actuate the cutting tool 59 (i.e. the cutting blade 59).

Advantageously, the electronic control unit 57 has a man/machine interface in the form of a touchscreen for the user to input the various data.

It will have been understood that, unlike conventional tile cutters, the invention is notable in that it proposes automated positioning and cutting of the tile. The invention is notable in that, once positioned, the tile is not moved while it is being cut.

In a first phase, the user will input into the electronic control unit 57 the various parameters relating to the tile that is to be cut, such as, for example, the material in which it is made, its dimensions and its thickness. He then inputs the parameters corresponding to the cutting line along which the tile is to be cut, and possibly parameters relating to the cutting tool used, such as the type of cutting disk mounted on the tile cutter. These various parameters will be able to be used by the electronic unit on the one hand to determine the line along which the tile is to be cut but also the translational speed that the cutting tool is to adopt and, where appropriate, the rotational speed of the cutting disk.

For example, a 30×30 cm tile may be cut along a straight line 20 cm from one of its sides so as to form a rectangle, or alternatively along a diagonal cut so as to form a right trapezium of which the two parallel sides do not have the same length, or a triangle. The electronic control unit 57 will therefore, according to the various parameters input, calculate the placement that the end stops and/or the guide rail 61 of the cutting tool need to have.

Specifically, according to a first alternative form of the invention, the location of the cutting means 55 is fixed, which means to say that the guide rail 61 of the cutting tool is unable to move along the cutting table 31 and is not angularly orientable with respect to this table. For preference, a vertical movement aimed at placing the blade 59 against the tile so that it can be cut or of distancing it therefrom for example by raising the blade 59 between two cutting operations is allowed. The blade 59 is of course capable of translational movement along said guide rail 61. Another possibility, not depicted, is to move the blade in the direction of the tile along its guide rail, for example across the width of the cutting table.

Advantageously, the cutting means 55 comprise a water pump configured to spray water onto the cutting blade 59 so as to cool it during the cutting operation. In such instances, the tile cutter will advantageously have a means (for example by blowing air) for drying the cut tile.

With reference to FIG. 2, it may be seen that the fixed positioning of the guide rail according to the length of the cutting table 31 allows the cutting table 31 to be provided with an opening or slot 63 along the cutting line. A person skilled in the art will advantageously favor an opening for the removal of cutting dust. This transverse opening or slot 63 offers a passage for the blade and makes it possible not to damage the cutting table 31 during the cutting operations.

Advantageously, the end stops 15 are capable of translational movement along the cutting table 31, which has a longitudinal opening 23 associated with each end stop 15. The end stops 15 are preferably capable of moving independently of one another so that they can be aligned or offset along the length of the cutting table 31. The end stops 15 are therefore associated with positioning means 17 (depicted in FIG. 3), for example actuating cylinders.

The means employed for automatically positioning the tiles operate as follows. The electronic control unit will position the end stops 15 along the cutting table 31 according to the size of the tile and according to the programmed cut. The position of the cutting tool (i.e. of the blade) is used as reference. The tile is loaded onto the conveyor 11 at the loading zone 5 and is conveyed as far as the cutting zone 7. At the cutting zone 7, the movement of the tile is halted by its coming into contact with the end stops 15. When the end stops are aligned along the length of the cutting table 31, the cutting line will be a straight line, which means to say a line parallel to one of the sides of the tile. When the end stops 15 are offset from one another along the length of the cutting table 31, the tile will come into contact with a first end stop 15 and will pivot as a result of it being driven by the conveyor or conveyors 11 until it comes into abutment with the other end stops 15. For preference, the electronic control unit is configured to place the end stops in position successively, in a first phase two first end stops are arranged in such a way as to orient the tile and in a second phase another end stop is brought into place in order to halt any translational movement of the tile. This configuration is particularly advantageous when the tile positions itself at an angle on the conveyor so that it can be cut diagonally, which is to say not parallel to one of the sides of the tile.

Thus, according to a preferred embodiment of the invention, the tile cutter comprises at least three end stops and the electronic control unit is configured to place said end stops in the abutment position successively when at least two end stops are not aligned along the length of the cutting table; for preference, at least two end stops are placed in the abutment position in a first phase (so as to allow the tile to turn in order to position itself) and at least one end stop is brought into the abutment position in the second phase (so as to prevent translational movement of the tile along the at least two first end stops).

According to a second alternative form of the invention, not depicted, the guide rail of the cutting tool is able to move along the cutting table and/or is angularly orientable. In this embodiment, the end stops may be fixed or mobile. The change in position of the guide rail of the cutting tool with respect to the cutting table is controlled by the electronic control unit according to the tile cutting parameters input by the user. When the end stops are fixed, only the movement and angular orientation of the cutting tool (preferably of the cutting blade) allow to define the cutting line. When the end stops are mobile, the additional movement and additional possibility for angular orientation of the cutting tool offer greater freedom of choice as to the cutting angles that can be achieved and as to the sizes of tile that can be cut.

In the remainder of the description, the tile cutter will be described with reference to the first alternative form in which the guide rail 61 is fixed in position relative to the cutting table 31. A person skilled in the art will have no trouble in adapting the other aspects of the invention to suit the alternative forms of tile cutter that have a cutting tool guide rail that is capable of translational movement along the length of the cutting table and/or that is angularly orientable with respect to the width of the table.

The tile may be fed by hand or automatically as will be seen later on. The tile is set down on at least one conveyor 11 which will move it from a loading zone 5 as far as the cutting zone 7.

For preference, and as illustrated in FIG. 3, the conveyor or conveyors (11, 13) take the form of a plurality of thin belts or of wires 25 driven by a motor rotating around a pulley shaft and around support elements 19. The conveyor or conveyors (11, 13) therefore have at least two drive belts or wires 25 and preferably at least three drive belts or wires 25. The belts or wires 25 are spaced apart from one another and distributed across the width of the cutting table 31.

According to one advantageous embodiment of the invention, illustrated in FIGS. 4a to 4c, the conveyor or conveyors (11, 13) are also able to move from an elevated position in which they transport the tile 21, or the cut tile and the offcut, above the cutting table 31; and a lowered position in which they retract into the cutting table 31 so as to set the tile 21 down on said cutting table 31 so that it can be cut. The conveyor or conveyors (11, 13) therefore cross the cutting table through longitudinal openings (not depicted) exhibited by said table (31).

When the conveyor or conveyors (11, 13) are in the elevated position as illustrated in FIG. 4a, the tile 21 is placed on the conveyor or conveyors (11, 13) which can therefore handle it so as to move it toward the cutting zone. While it is being transported, the tile 21 is raised up in relation to the cutting table 31 and does not touch it. The conveyor or conveyors (11, 13) will transport the tile from one position to another along the cutting table 31 in the direction of the end stops 15 prior to cutting, and in the direction of the ends of the table after cutting. When the conveyor or conveyors (11, 13) are in the lowered position as illustrated in FIG. 4b, their surface for handling the tile 21 is preferably situated lower down than the surface of the cutting table 31, so that the conveyor or conveyors (11, 13) are no longer in contact with the tile 21. The tile 21 is set down on the cutting table 31 by the relative movement of the cutting table 31 and of the conveyor or conveyors (11, 13) with a view to placing the conveyor or conveyors (11, 13) in a lower position. Potentially, according to one alternative form of the invention, in the lowered position, the conveyor or conveyors (11, 13) lie flush with the surface of the cutting table 31 so as to contribute to the positional stability of the tile 21 while it is being cut.

According to one preferred embodiment of the invention, the tile cutter 1 therefore comprises means for raising and lowering the conveyor or conveyors and/or the cutting table. These raising and lowering means may be associated with the conveyor(s), with the cutting table or with both, so as to minimize the amplitude of the travel. The raising and lowering means are controlled by the electronic control unit.

When they are associated with the conveyor(s) (11, 13), the raising and lowering means may operate as follows.

When a tile 21 to be cut is loaded onto at least one conveyor at the loading zone, the conveyor or conveyors 11 are placed in the elevated position so as to be able to handle the tile 21. They then convey it toward the cutting zone where the tile 21 will position itself by contact with the end stops 15. Once the tile 21 is in position, the raising and lowering means will lower the conveyor or conveyors (11, 13) so that the surface of the cutting table 31 is at a height level with or above the handling surface of the conveyor or conveyors (11, 13).

A person skilled in the art will advantageously halt the conveyor or conveyors (11, 13) before moving them vertically, as we shall see later on.

According to one embodiment of the invention, the electronic control unit is configured to consider that the tile 21 is in place for cutting after a predetermined length of time has elapsed between the moment that the tile 21 was set down on the conveyor or conveyors 11. This time may for example be 30 seconds. Alternatively or in addition, it is possible to place contact detectors on the end stops 15, these being configured to transmit to the electronic control unit information that the tile 21 is in place. The electronic control unit will then command the setting-down of the tile 21 on the cutting table 31 by bringing the conveyor or conveyors (11, 13) into the lowered position, preferably after having altered the conveyor or conveyors (11, 13).

According to one preferred embodiment of the invention, the conveyor or conveyors (11, 13) are borne by a carriage 29 and the raising and lowering means act on the carriage 29 to move same vertically. For example, the raising and lowering means may comprise pivots 35 turned by at least one actuating cylinder 39. In the embodiment depicted, the pivots 35 are mounted articulated by their lower end, but articulating them via their upper end is possible if the mechanism is inverted. The upper end of the pivots 35 is associated with a wheel 37 supporting the carriage 29. The extending of the actuating cylinder 39 will determine the angle of the pivots 35 with respect to the vertical. When the pivots 35 are in the vertical position, the carriage 29 and therefore the conveyors (11, 13) are in the elevated position. When an angle with respect to the vertical is defined, the carriage 29 is lowered and the conveyors (11, 13) are in the lowered position. For preference, there are an even number of the pivots 35, distributed in pairs on two opposite sides of the support 3. In one preferred embodiment of the invention, illustrated in FIG. 4c, the actuating cylinder 39 is connected by one of its ends to the support 3 and by its other end to a shaft 43 connecting the shafts of two wheels 37 that are aligned in the transverse direction of the table. Advantageously, the carriage 29 is supported by four wheels. The actuating cylinder 39 will therefore drive the movement of the two wheels and this movement is transmitted to the others by at least one connecting bar 41.

According to a preferred embodiment of the invention, the carriage 29 has openings in its base and the vertical movement of the carriage 29 is guided by vertical guides 45 passing through said openings.

The person skilled in the art may conceive of other raising and lowering means, such as setting actuating cylinders vertically between the carriage and the support for example.

For preference, the cutting table is covered with a non-slip coating so that once set down on its surface, the tile cannot slip and alter the position imparted to it. Potentially, the setting-down of the tile on the cutting table is accompanied by a pressing of the tile against said table for example by setting a weight down on said tile, or by any suitable means, with a view to preventing any movement of the tile while it is being cut.

Advantageously, the end stops 15 are able to move from an abutment position in which they oppose the movement of the tile into a retracted position (not depicted) in which they no longer oppose the movement of the tile. For preference, the conveyor or conveyors (11, 13) is or are brought into the lowered position parallel to the direction in which the end stops 15 are brought into the retracted position. Thus, the end stops 15 are no longer in contact with the tile 21 at the moment that it is being cut. This configuration is advantageous in that it makes it possible to avoid damaging the edges of the tile 21 by rubbing against the end stops 15 as a result of the vibrations caused during the cutting operation. For preference, the end stops 15 position themselves in the retracted position by pivoting about their lower end so as to place them from a vertical position into a horizontal position. This movement is preferable to a vertical movement which would rub against the edge of the tile and risk damaging it or moving the tile with respect to the defined cutting line. In addition, a rotational movement is advantageous if the end stops are being placed in the abutment position successively. Since the end stop intended to stop the translational movement of the tile is raised in the direction of the tile, it can correct its position. According to a preferred embodiment of the invention, the end stops 15 are therefore placed in the abutment position by rotation in the direction of the tile (i.e. in an opposite direction to that of the conveyors) so as to intercept at the tile and possibly push it backward slightly.

The tile is therefore set down on the cutting table and the cutting operation proper can take place. Once the cut has been made, the conveyor or conveyors are returned to the elevated position so as to be able to handle the cut tile and its offcut so that these can be discharged.

According to preferred embodiment of the invention, the cut tile and the offcut are removed in different directions. Thus, as illustrated in FIG. 2, the tile cutter will have two conveyors (11, 13) arranged one after the other along the length of the cutting table 31. Where the two conveyors (11, 13) meet, the conveyor belts or wires 25 of the first 11 and of the second 13 conveyor may advantageously be intercalated over a short distance so that the tile can be handled continuously. The zone at which the two conveyors (11, 13) meet is preferably situated at the cutting line 33 (depicted in FIG. 3). The first conveyor 11 extends from the loading zone 5 as far as the tile cutting zone 7 and the second conveyor 13 extends from the cutting zone 7 as far as an offloading zone 9 where the cut tile is offloaded.

Alternatively, the conveyor belts or wires 25 of the first 11 and of the second 13 conveyor may be separated along the length of the cutting table 31. This configuration in which a space is left between the first and second conveyor is advantageous when the conveyors (11, 13), in the lowered position, lie flush with the surface of the cutting table to prevent them from being cut during the cutting operation.

During conveying toward the cutting zone 7 and the placement of the tile, the two conveyors are actuated to transport the tile in the same direction. Once the cut has been made, the raising of the conveyors (11, 13) will place the offcut on the first conveyor 11 and the cut tile on the second conveyor 13, or vice versa depending on how the electronic control unit has been programmed. The first and the second conveyor (11, 13) are then actuated by the electronic control unit to convey the offcut and the cut tile in different, opposite, directions so as to move them away from one another. The second conveyor 13 will convey the cut tile toward the tile offloading zone 9 and the first conveyor 11 will convey the offcut toward the offcut offloading zone which preferably coincides with the loading zone 5 at which the tile that is to be cut is loaded.

According to one embodiment of the invention illustrated in FIG. 1, the tile cutter 1 comprises loading and offloading means 47 that allow the automatic loading of the tile and the automatic offloading of the offcut and of the cut tile. The loading and offloading means 47 comprise a means for detecting the tile, the offcut or the cut tile. This detection means is, for example, a position sensor, for example an optical sensor.

The loading means 47 will detect the tile placed on the ground or on a support (not depicted) or a storage zone and position itself to allow the tile to be grasped by means of a venturi suction cup (for example) 53 or a lateral gripping means such as a gripper (for example). For preference, the storage zone comprises a sensor configured to inform the electronic control unit of the presence of at least one tile. This sensor may be a weight sensor or an optical sensor.

Likewise, a person skilled in the art will advantageously fit the venturi suction cup (if present) with a tile-presence sensor, for safety reasons.

Once the tile has been collected, the loading means 47 will move and by releasing the tile set it down on the conveyor or conveyors 11 in the loading zone. For this purpose, the loading means 47 may comprise a mobile articulated arm 47.

The loading means 47 for example comprise a lever 49 and a shaft 51 which are articulated to one another at one of their ends. The shaft 51 is capable of vertical rotation thanks to a motor (not depicted), and the lever 49 can be inclined by means of an actuating cylinder (not depicted). The shafts 51 exhibited by the loading and offloading means 47 will advantageously be of circular cross section to make it easier for them to rotate about a vertical axis.

Advantageously, the offcut offloading means coincide with the tile loading means.

According to one embodiment of the invention, the electronic control unit is configured to sort the offcuts according to size, setting them down on distinct supports. Offcuts not recovered may simply be disposed of by the conveyor into a collecting tub at the end of the cutting table. This is because the offcuts may be large enough to be reused or recut. The cut tile offloading means are advantageously similar.

The invention claimed is:

1. A tile cutter comprising:
a cutting table to accept a tile that is to be cut;
a cutting tool translationally movable along a guide rail and to cut the tile along a cutting line to obtain a cut tile and an offcut;
a first conveyor to transport the tile from a loading zone where the tile is loaded directly to a tile cutting zone defined on a surface of the cutting table, wherein the first conveyor is borne by a carriage;
two end stops to halt movement of the tile in the cutting zone by placing the tile in a predefined position;
an electronic control unit configured to control respective placement of the end stops and of the cutting tool according to predefined cutting parameters and to actuate the cutting tool; and
pivots having an upper end associated with a wheel supporting the carriage for raising and lowering the first conveyor, the pivots being turned by at least one actuating cylinder to move the first conveyor vertically between (1) an elevated position with respect to the cutting table so that the tile, or the cut tile and the offcut, are borne by the first conveyor and (2) a lowered position so that the tile, or the cut tile and the offcut, rest on the cutting table.

2. The tile cutter as claimed in claim 1, wherein the cutting tool is a cutting blade.

3. The tile cutter as claimed in claim 1, wherein the end stops are mobile and associated with positioning means for positioning along a length of the cutting table, and the electronic control unit is configured to control the positioning means of each end stop independently to place the end stops in-line with or offset from one another along the length of the cutting table.

4. The tile cutter as claimed in claim 1, wherein the guide rail of the cutting tool is at least one of: mobile along the cutting table, or angularly orientable with respect to a width of the cutting table so as to be able to cut the tile along the cutting line that is not perpendicular and not parallel to a length of the cutting table.

5. The tile cutter as claimed in claim 1, wherein the guide rail has a fixed position with respect to the cutting table.

6. The tile cutter as claimed in claim 1, further including a second conveyor extending from the cutting zone to an offloading zone for offloading the cut tile, the first and second conveyors arranged one after the other along a length of the cutting table, and wherein the electronic control unit is configured to control removal of the offcut and of the cut tile by the first and second conveyors in opposite directions.

7. The tile cutter as claimed in claim 6, wherein the first and second conveyors each have two conveying belts or wires distributed across a width of the cutting table.

8. The tile cutter as claimed in claim 6, wherein the first and second conveyors each have three conveying belts or wires distributed across a width of the cutting table.

9. The tile cutter as claimed in claim 6, wherein the end stops are mobile between an abutment position in which the end stops oppose the movement of the tile by at least one of the first conveyor or the second conveyor and a retracted position in which the end stops do not oppose the movement of the tile by at least one of the first conveyor or the second conveyor.

10. The tile cutter as claimed in claim 1, wherein the cutting table has a non-slip support.

11. The tile cutter as claimed in claim 1, further including at least one of:

means for loading tiles from a storage zone to the loading zone, or means for offloading the cut tile and the offcut.

12. The tile cutter as claimed in claim 11, wherein at least one of the loading means or the offloading means includes an articulated arm fitted with a means for grasping the tile.

13. The tile cutter as claimed in claim 12, wherein the grasping means includes at least one of a venturi suction cup or a lateral gripping means.

14. The tile cutter as claimed in claim 11, wherein the electronic control unit is configured to determine a size of the offcut according to a size of the tile that is to be cut and a position of the cutting line on the tile, and to sort offcuts according to size using the means for offloading.

* * * * *